(12) United States Patent
Valentine et al.

(10) Patent No.: US 10,911,742 B2
(45) Date of Patent: Feb. 2, 2021

(54) ELECTRONIC DEVICE WITH FLEXIBLE DISPLAY AND LOUVERED FILTER, AND CORRESPONDING SYSTEMS AND METHODS

(71) Applicant: Motorola Mobility LLC, Chicago, IL (US)

(72) Inventors: Mark Frederick Valentine, Kenosha, WI (US); Adrian Gheorghe Manea, Libertyville, IL (US); Sen Yang, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 893 days.

(21) Appl. No.: 15/063,952

(22) Filed: Mar. 8, 2016

(65) Prior Publication Data

US 2017/0264888 A1 Sep. 14, 2017

(51) Int. Cl.
| | |
|---|---|
| *G06T 5/00* | (2006.01) |
| *G06F 3/041* | (2006.01) |
| *H04N 13/317* | (2018.01) |
| *H04N 13/31* | (2018.01) |
| *H04N 13/139* | (2018.01) |
| *G06F 1/16* | (2006.01) |

(52) U.S. Cl.
CPC ......... *H04N 13/317* (2018.05); *G06F 1/1637* (2013.01); *G06F 1/1652* (2013.01); *H04N 13/139* (2018.05); *H04N 13/31* (2018.05); *G06F 2203/04102* (2013.01)

(58) Field of Classification Search
CPC ......... G06F 2203/04102; G06F 3/0412; G06T 5/006; H04N 13/0415
USPC ........................................................... 348/51
See application file for complete search history.

(56) References Cited

U.S. PATENT DOCUMENTS

| 5,521,724 A | * | 5/1996 | Shires | ...................... G02B 5/32 |
| | | | | 359/15 |
| 2009/0085831 A1 | * | 4/2009 | Odoi | ................. G02F 1/133524 |
| | | | | 345/1.3 |
| 2010/0182218 A1 | * | 7/2010 | Daniel | ...................... G09F 9/33 |
| | | | | 345/1.3 |
| 2013/0155052 A1 | * | 6/2013 | Ko | ..................... H04N 13/0022 |
| | | | | 345/419 |
| 2013/0222718 A1 | * | 8/2013 | Oohira | ............... H04N 13/0409 |
| | | | | 349/15 |
| 2014/0055429 A1 | * | 2/2014 | Kwon | ..................... G09G 3/001 |
| | | | | 345/204 |
| 2015/0002643 A1 | * | 1/2015 | Jung | .................. H04N 13/0445 |
| | | | | 348/51 |
| 2015/0234508 A1 | * | 8/2015 | Cho | ...................... G06F 3/0412 |
| | | | | 345/173 |

(Continued)

*Primary Examiner* — Joon Kwon
(74) *Attorney, Agent, or Firm* — Philip H. Burrus, IV

(57) ABSTRACT

An electronic device includes one or more processors and a display that is flexible. A louvered filter, which can be optionally configured in an electronic device attachment, as a first louvered filter and a second louvered filter, or otherwise, is then disposed along the flexible display. When the flexible display is deformed by one or more bends, the one or more processors can present a first image through a first portion of the louvered filter and a second image through a second portion of the louvered filter to present stereoscopic content without the need of special glasses.

20 Claims, 10 Drawing Sheets

(56) References Cited

U.S. PATENT DOCUMENTS

| | | | |
|---|---|---|---|
| 2015/0301636 A1* | 10/2015 | Akimoto | G06F 3/044 345/173 |
| 2015/0331496 A1* | 11/2015 | Kwak | G06F 3/0487 345/156 |
| 2015/0366089 A1* | 12/2015 | Park | G06F 1/1641 361/679.01 |
| 2016/0048170 A1* | 2/2016 | Kim | G06F 3/0414 345/173 |
| 2016/0154435 A1* | 6/2016 | Yanagisawa | A61B 3/005 348/47 |
| 2017/0061932 A1* | 3/2017 | Kwon | G06F 3/04817 |
| 2017/0262070 A1* | 9/2017 | Kwak | G06F 3/0487 |

* cited by examiner

ELECTRONIC DEVICE WITH FLEXIBLE DISPLAY AND LOUVERED FILTER, AND CORRESPONDING SYSTEMS AND METHODS

BACKGROUND

Technical Field

This disclosure relates generally to electronic devices and corresponding methods, and more particularly to physically deformable electronic devices.

Background Art

Mobile electronic communication devices, such as mobile telephones, smart phones, gaming devices, and the like, are used by billions of people. These owners use mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

These smaller, yet more powerful, devices are being used for many different applications in many different environments. It would be advantageous to have improved operating modes of an electronic device to adapt performance to a given environment or application.

Figure 1:
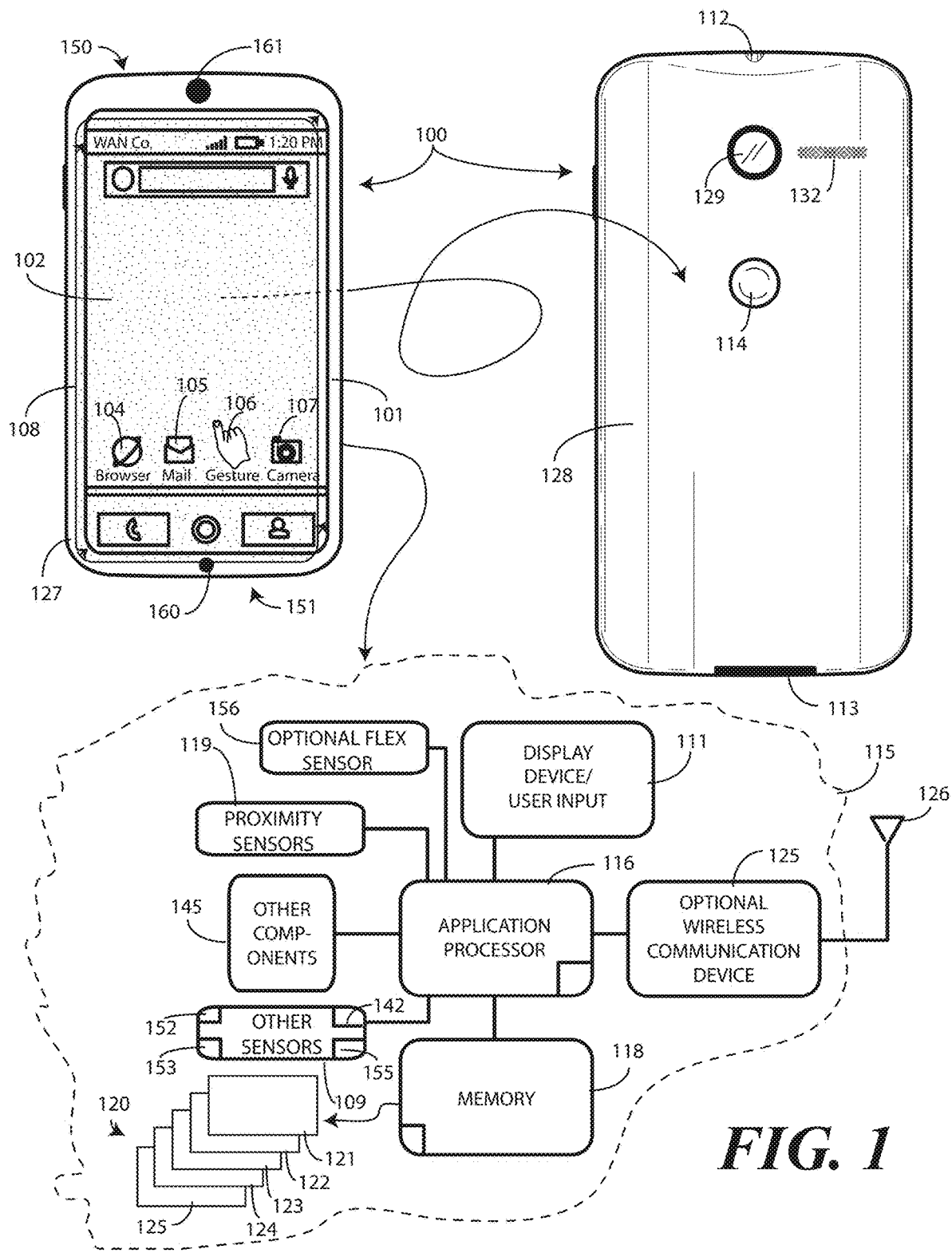
FIG. 1 illustrates a schematic block diagram of one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, in response to a bending operation occurring to deform a flexible display of the electronic device, presenting a first image and a second image through a louvered filter to provide, in one embodiment, stereoscopic video content to a user. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of performing control operations such as the presentation of left and right images of stereoscopic through a louvered filter disposed along a flexible display deformed by one or more bends as described herein. The non-processor circuits may include, but are not limited to, imaging devices, microphones, loudspeakers, acoustic amplifiers, digital to analog converters, signal drivers, clock circuits, power source circuits, and user input devices. As such, these functions may be interpreted as steps of a method to perform control operations when a flexible display is deformed by one or more bends. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device having a flexible display, improve the functioning of the electronic device itself by facilitating the presentation of stereoscopic imagery and improving the overall user experience to overcome problems specifically arising in the realm of the technology associated with electronic device user interaction.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure employ a system that includes an electronic device with a flexible display, where a louvered filter is disposed along the flexible display. When the flexible display is deformed by one or more bends, one or more processors operable with the flexible display are configured to present a first image through a first portion of the louvered filter and a second image through a second portion of the louvered filter. When a user looks at the display, the louvered display allows the first image to be seen by one eye while precluding that image from being seen by the other eye. The opposite is true with the second image. Thus, a viewer can view the first image with, for example, their right eye, while viewing a second image with their left eye. The louvered filter precludes the left eye from seeing the first image and the right eye from seeing the second image. Accordingly, when the first image and the second image are left and right images of stereoscopic content, the user can enjoy a three-dimensional perspective of video content by bending the flexible display and viewing dual images through the louvered filter.

In one or more embodiments, the electronic device includes both a flexible display and a physically deformable housing. In one embodiment, the housing is a flexible hosing and the display is a bendable display. Internal and external components can be flexible as well. For instance, flexible batteries and flexible circuit boards can support various components within the electronic device. Touch sensors and substrates can be flexible as well. Remaining or other components disposed within the electronic device, such as one or more processors, other sensors, and other devices, are arranged such that a user can flex, bend, and/or fold the electronic device by executing a bending operation that physically deforms one or more of the housing or display into a deformed geometry.

In one embodiment, one or more optional flex sensors are operable with the one or more processors of the electronic device. Where included, the optional flex sensors can detect a user's bending operation. The one or more flex sensors can also determine a configuration of the deformed geometry after the bending operation. For example, the optional flex sensors can determine whether one or more folds deforming the flexible display include a single fold, a multifold geometry, or other geometries.

In one or more embodiments, the one or more processors can present a first image and a second image, on opposite sides of a bend in the flexible display and through the louvered filter, to deliver a unique and transformative user experience as a function of the geometry and the orientation of the electronic device. Illustrating by example, in one embodiment where the flexible display is deformed by a single bend, a left image of stereoscopic content can be presented through the louvered filter on one side of the bend, while a right image of stereoscopic content can be presented on the other side of the bend. This allows the user to view three-dimensional content.

The deformability of embodiments of the disclosure not only offer unique ways of viewing content, such as stereoscopic content, but can additionally make the device easier to use. For example, by being able to stand an otherwise thin electronic device on its side, the display can be easily viewable despite the fact that the electronic device is out of the user's hand. Bending the device into folded and multifold shapes allows the device to transform into a "self-standing" device, which can free a user's hands for other activities.

In one or more embodiments, different deformed geometries can launch different modes of operation. Illustrating by example, if the electronic device is bent with a single fold, when placed on a table the electronic device can resemble a card folded into a "tent fold." Where this occurs, one or more processors of the electronic device can partition the display into two parts, with each part being on a different side of the "tent." This configuration can cause the one or more processors to present left and right images of stereoscopic content on either sides of the tent to provide three-dimensional video content. However, in one or more embodiments, a number of bends can be used to partition the display. Where this is the case, the one or more processors may be able to present four images to provide two different stereoscopic content offerings to two different users. More permutations are completely possible and will be described in the paragraphs below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure. In one or more embodiments, an OLED is constructed on flexible plastic substrates can allow the display 102 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 102 may be formed from multiple layers of flexible material such as flexible sheets of polymer or other materials.

In one or more embodiments, a louvered filter 108 is disposed along at least a portion of the display 102. As will be shown in more detail below with reference to FIG. 2, in one or more embodiments, the louvered filter 108 is configured as a film that can be electrostatically, adhesively, magnetically, or otherwise coupled to the outer surface of the display 102. In one or more embodiments, the louvered filter 108 includes a plurality of closely spaced "micro" louvers arranged in a configuration within the film that is akin to the blinds of a Venetian blind used with a window. Each louver of the louvered filter 108 directs light from the display 102 out at a substantially normal angle, while precluding light emanating from the display 102 at angles smaller than a critical angle from passing through the louvered filter 108. Accordingly, light can pass from the display 102 through the louvered filter 108 at substantially a normal angle, but is precluded from passage at a zero angle due to the presence of the louvers.

Illustrating by example, as viewed in FIG. 1, light would pass through the louvered filter 108 directly out of the page. However, as the angle of light emanating from the display 102 deviated from than normal alignment by more than a predetermined amount, it would be absorbed by the louvers. The amount of deviation from normal varies based upon the thickness of the louvered filter 108, the thickness of the louvers, the design and material of the louvers, and other factors. Thus, when viewing the display 102 at a normal angle, a maximum amount of light will be passed through the louvered filter 108. At angles relative to normal, this maximum amount of light is reduced. In one embodiment, when the angle is, say, fifteen degrees from normal, the amount of light might be reduced by thirty-five percent or so. At an angle thirty degrees from normal, in many embodiments, light from the display 102 will be precluded from passing through the louvered filter 108. These examples are for ordinary louvers, and the angles may change depending upon the design and/or characteristics of the louvers. For example, the louvers can be spaced closer or further apart. Additionally the depth of the louvers can be changed.

The explanatory electronic device 100 of FIG. 1 also includes a housing 101. In one or more embodiments, the housing 101 is flexible. In one embodiment, the housing 101 may be manufactured from a malleable, bendable, or physically deformable material such as a flexible thermoplastic, flexible composite material, flexible fiber material, flexible metal, organic or inorganic textile or polymer material, or other materials. In other embodiments, the housing 101 could also be a combination of rigid segments connected by hinges or flexible materials. Still other constructs will be obvious to those of ordinary skill in the art having the benefit of this disclosure.

The housing 101 can be formed from a single flexible housing member or from multiple flexible housing members. In this illustrative embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are show disposed on the rear major face of the electronic device 100 in this embodiment, but could be placed on the front major face if the electronic device 100 as will be described in more detail below with reference to FIG. 10. In this illustrative embodiment, a user interface component 114, which may be a button or touch sensitive surface, can also be disposed along the rear-housing member 128. As noted, any of these features are shown being disposed on the rear major face of the electronic device 100 in this embodiment, but could be located elsewhere, such as on the front major face in other embodiments.

In one embodiment, the electronic device 100 includes one or more connectors 112,113, which can include an analog connector, a digital connector, or combinations thereof. In this illustrative embodiment, connector 112 is an analog connector disposed on a first end 150, i.e., the top end, of the electronic device 100, while connector 113 is a digital connector disposed on a second end 151 opposite the first end 150, which is the bottom end in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present, images, video, or other presentation information to a user. The executable software code used by the one or more processors 116 can be configured as one or more modules 120 that are operable with the one or more processors 116. Such modules 120 can store instructions, control algorithms, logic steps, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a gesture application 106 configured to detect gesture actions by a user near or along the electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, one or more proximity sensors 119 can be operable with the one or more processors 116. In one embodiment, the one or more proximity sensors 119 include one or more proximity sensor components 140. The proximity sensors 119 can also include one or more proximity detector components 141. In one embodiment, the proximity sensor components 140 comprise only signal receivers. By contrast, the proximity detector components 141 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

Figure 4:
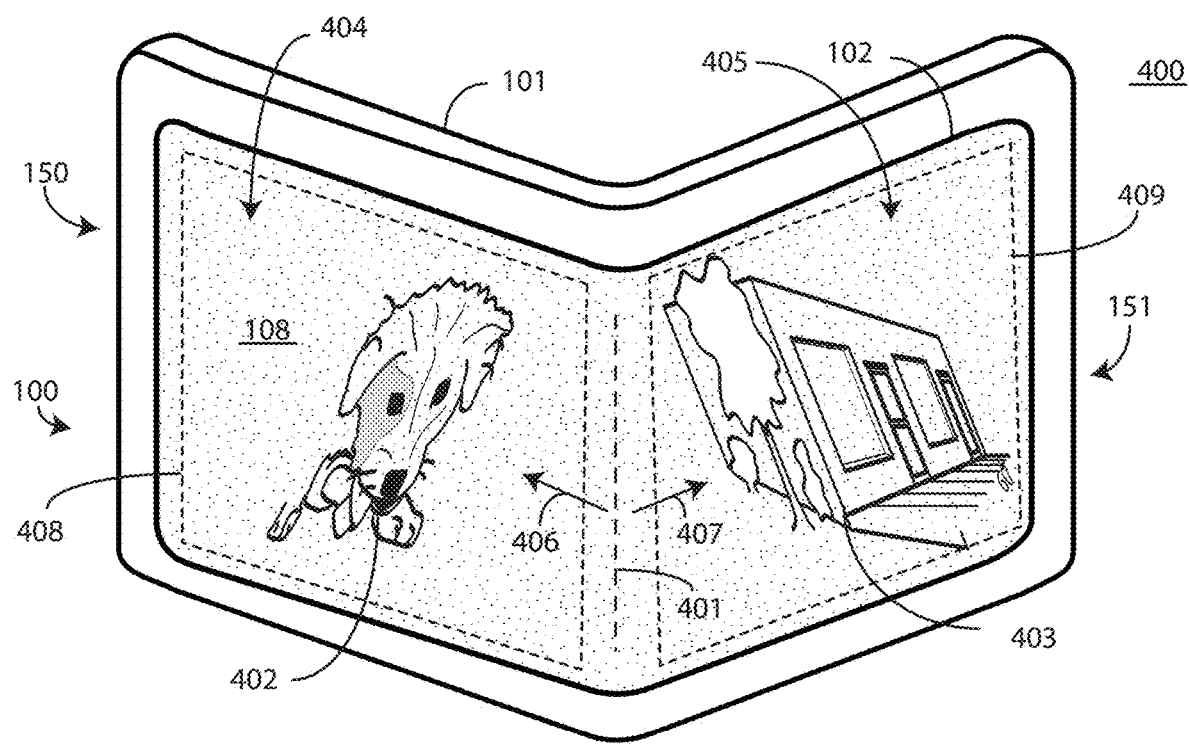
FIG. 4 illustrates one explanatory electronic device having a flexible display that is deformed by one or more bends in accordance with one or more embodiments of the disclosure.
Figure 5:
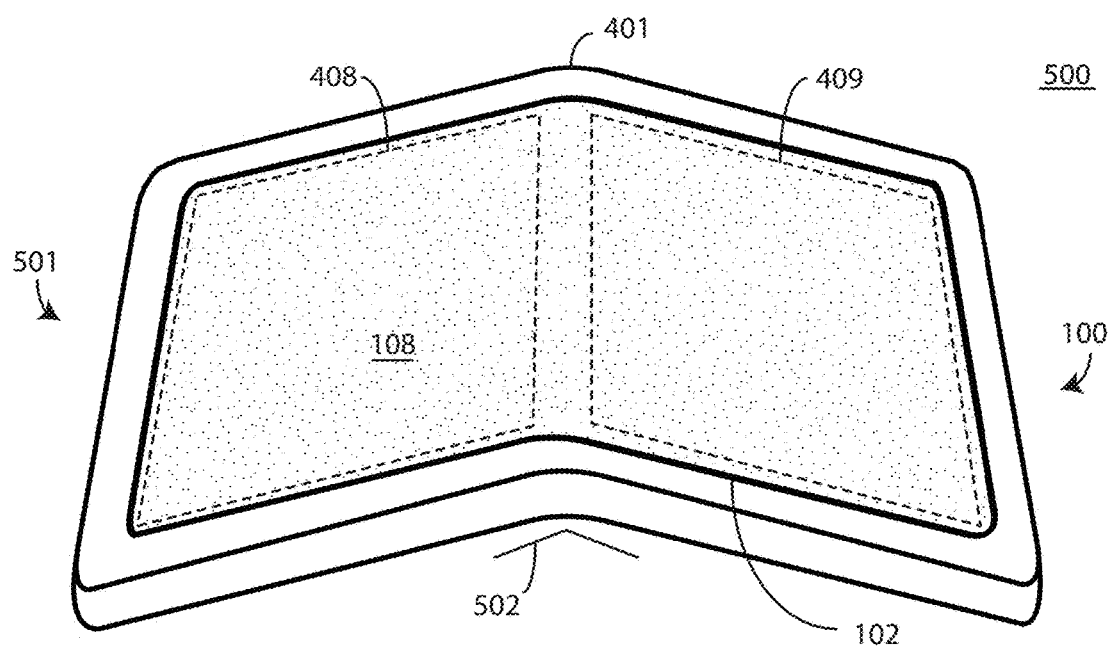
FIG. 5 illustrates one explanatory electronic device having a flexible display that is deformed by one or more bends in accordance with one or more embodiments of the disclosure.

In one embodiment, the electronic device 100 includes one or more flex sensors 156, operable with the one or more processors 116, to detect a bending operation deforming one or more of the housing 101 or the display 102 into a deformed geometry, such as that shown in FIGS. 4-5. The inclusion of flex sensors 156 is optional, and in some embodiment flex sensors 156 will not be included. As one or more functions of the electronic device 100 occur when the display 102 is deformed by one or more bends, where flex sensors 156 are not included, the user can alert the one or more processors 116 to the fact that the one or more bends are present through the user interface 111 or by other techniques.

In one embodiment, the flex sensors 156 each comprise passive resistive devices manufactured from a material with an impedance that changes when the material is bent, deformed, or flexed. By detecting changes in the impedance as a function of resistance, the one or more processors 116 can use the one or more flex sensors 156 to detect bending or flexing. In one or more embodiments, each flex sensor 156 comprises a bi-directional flex sensor that can detect flexing or bending in two directions. In one embodiment, the one or more flex sensors 156 have an impedance that increases in an amount that is proportional with the amount it is deformed or bent.

In one embodiment, each flex sensor 156 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 156 bends, the impedance of the resistive layer changes, thereby altering the flow of current for a given voltage. The one or more processors 116 can detect this change to determine an amount of bending. Taps can be added along each flex sensor 156 to determine other information, including the number of folds, the degree of each fold, the direction of the folds, and so forth. The flex sensor 156 can further be driven by time-varying signals to increase the amount of information obtained from the flex sensor 156 as well.

While a multi-layered device as a flex sensor 156 is one configuration suitable for detecting at least a bending operation occurring to deform the electronic device 100 and a geometry of the electronic device 100 after the bending operation, others can be used as well. For example, in another embodiment the proximity sensors 119 can be used to detect how far the first end 150 of the electronic device 100 is from the second end 151 of the electronic device 100.

Still other types of flex sensors 156 will be obvious to those of ordinary skill in the art having the benefit of this disclosure.

In one embodiment, the one or more processors 116 may generate commands or execute control operations based on information received from the various sensors, including the one or more flex sensors 156, the user interface 111, the one or more proximity sensors 119, or the other sensors 109. The one or more processors 116 may also generate commands or execute control operations based upon information received from a combination of the one or more flex sensors 156, the user interface 111, the one or more proximity sensors 119, or the other sensors 109. Alternatively, the one or more processors 116 can generate commands or execute control operations based upon information received from the one or more flex sensors 156 or the user interface 111 alone. Moreover, the one or more processors 116 may process the received information alone or in combination with other data, such as the information stored in the memory 118.

The one or more other sensors 109 may include a microphone 160, an earpiece speaker 161, a second loudspeaker (disposed beneath speaker port 132), and a user interface component 114 such as a button. The one or more other sensors 109 may also include key selection sensors, a touch pad sensor, a touch screen sensor, a capacitive touch sensor, and one or more switches. Touch sensors 155 may used to indicate whether any of the user actuation targets present on the display 102 are being actuated. Alternatively, touch sensors 155 disposed in the housing 101 can be used to determine whether the electronic device 100 is being touched at side edges or major faces of the electronic device 100 are being performed by a user. The touch sensors 155 can include surface and/or housing capacitive sensors in one embodiment. The other sensors 109 can also include audio sensors and video sensors (such as a camera).

The other sensors 109 can also include motion detectors 142, such as one or more accelerometers 152 or gyroscopes 153. For example, an accelerometer 152 may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope 153 can be used in a similar fashion.

Regardless of the type of motion detectors 142 that are used, in one embodiment the motion detectors 142 are also operable to detect movement, and direction of movement, of the electronic device 100 by a user. In one or more embodiments, the other sensors 109 and the motion detectors 142 can each be used to detect motion corresponding to a user's body or to human motion. This information can be used to determine that the electronic device 100 is proximately located with a user's body.

Many of the sensors in the electronic device 100 can be used to detect movement, gestures, or other user input. For example, the one or more proximity sensors 119 can detect the gesture of a user waving a hand above the display 102. In another embodiment, the user can deliver gesture input by touching the display 102. In yet another embodiment, the accelerometer 152 can detect gesture input from a user lifting, shaking, or otherwise deliberately moving the electronic device 100. In yet other embodiments, the user can deliver gesture input by rotating or changing the orientation of the electronic device 100, which can be detected by multiple accelerometers 152 or a gyroscope 153. It should be clear to those of ordinary skill in the art having the benefit of this disclosure that additional sensors can be included with the other sensors 109 shown in FIG. 1.

Other components 145 operable with the one or more processors 116 can include output components such as video outputs, audio outputs, and/or mechanical outputs. Examples of output components include audio outputs such as speaker port 132, earpiece speaker 161, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
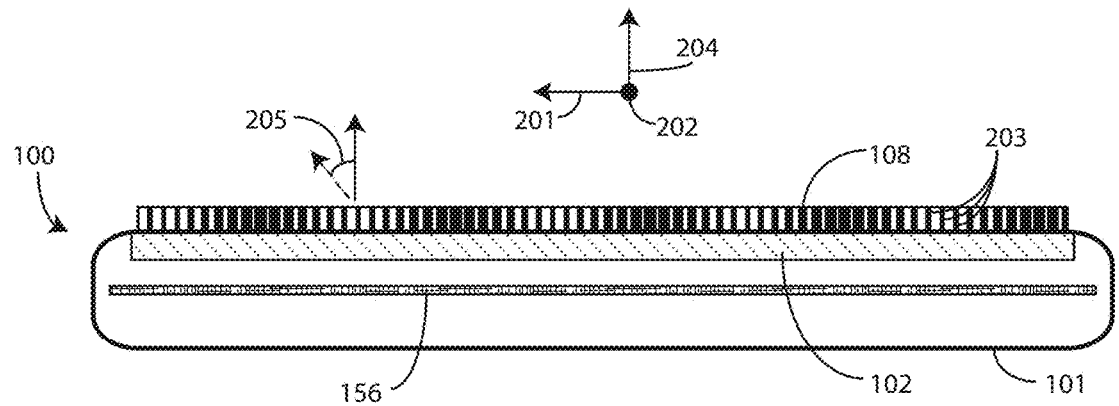
FIG. 2 illustrates a sectional view of one explanatory electronic device in accordance with one or more embodiments of the disclosure.

Now that the various hardware components have been described, attention will be turned to methods, systems, and use cases in accordance with one or more embodiments of the disclosure. Beginning with FIG. 2, illustrated therein is a sectional view of the electronic device 100. Shown with the electronic device 100 are the display 102 and the housing 101, each of which is flexible in this embodiment. Also shown is the flex sensor 156, which spans at least two axes 201,202 of the electronic device 100.

Disposed atop the display 102 is the louvered filter 108. As noted above, in one or more embodiments the louvered filter 108 is configured as a film that can be electrostatically, adhesively, magnetically, or otherwise coupled to the outer surface of the display 102. In this illustrative embodiment, the louvered filter 108 includes a plurality of closely spaced louvers 203. Each louver 203 of the louvered filter 108 directs light from the display 102 out at a substantially normal angle, i.e., along axis 204, while precluding light emanating from the display 102 at angles deviating from the normal angle by more than a critical angle 205 from passing through the louvered filter 108. Accordingly, light can pass from the display 102 through the louvered filter 108 at substantially a normal angle, but is precluded from passage at an angle deviating from the normal by more than a critical angle 205, such as thirty-five degrees, due to the presence of the louvers 203. As also noted above, the critical angle 205 will vary as a function of the thickness of the louvered filter 108, the thickness of the louvers 203, the design and material of the louvers 203, and other factors.

In this illustrative embodiment, each louver 203 is oriented substantially orthogonally with the portion of the display 102 disposed adjacent to that louver, i.e., directly beneath the display. Thus, as shown in FIG. 2, in this embodiment each louver 203 is oriented along axis 204, which is normal to the surface of the display 102 disposed beneath each louver 203. Since the display 102 is flat and extends along axes 201,202, all louvers 203 are oriented in the same direction. However, as will be shown below, once the electronic device 100 is bent, some louvers 203 will be oriented along a first axis while other louvers 203 will be oriented along a different axis. However, even when the electronic device 100 is bent, in one embodiment each louver remains normal to the surface portion of the display 102 disposed directly beneath it. Thus, in one embodiment each louver 203 is normal to the tangent of the closest portion of surface of the display 102.

Figure 3:
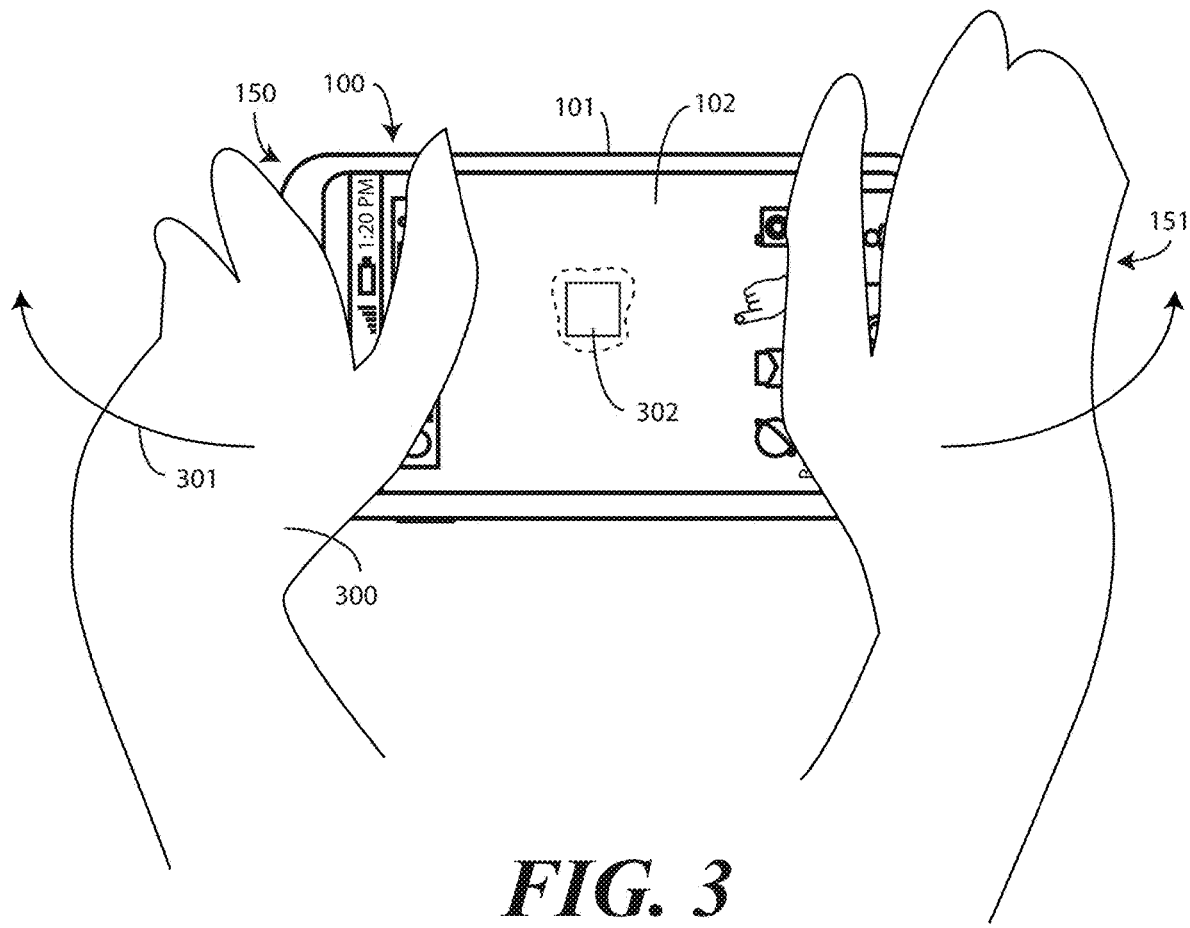
FIG. 3 illustrates a user manipulating one explanatory electronic device in accordance with one or more embodiments of the disclosure to execute a bending operation to deform the electronic device.

As shown in FIG. 3, a user 300 is executing a bending operation 301 upon the electronic device 100. In this illustration, the user 300 is applying force (into the page) at the first end 150 and the second end 151 of the electronic device 100 to bend both the housing 101 and the display 102. Internal components disposed along flexible substrates are allowed to bend as well. This method of deforming the housing 101 and display 102 allows the user 300 to simply and quickly bend the electronic device 100 into a desired shape.

In other embodiments, rather than relying upon the manual application of force, the electronic device can include a mechanical actuator 302, operable with the one or more processors (116), to deform the display 102 by one or more bends. For example, a motor or other mechanical actuator can be operable with structural components to bend the electronic device 100 to predetermined angles in one or more embodiments. As will be described in more detail below, in one embodiment the one or more processors (116) can present left and right images on the display 102 to provide stereoscopic content to the user 300. The bend angle of the electronic device 100 at which the user 300 can best see the stereoscopic content will vary as a function of the louvered filter 108 and size of the electronic device 100. The use of a mechanical actuator 302 allows a precise bend angle to be repeatedly achieved without the user 300 having to make adjustments. However, as the inclusion of a mechanical actuator 302 increases cost, in other embodiments this component will be omitted.

Regardless of whether the bending operation 301 is a manual one or is instead one performed by a mechanical actuator 302, it results in the display 102 being deformed by one or more bends. One result 400 of the bending operation 301 is shown in FIG. 4. As shown in FIG. 4, the display 102 is deformed by one or more bends. In this illustrative embodiment, the one or more bends comprise a single bend 401. However, in other embodiments, such as that shown below in FIG. 8, the one or more bends can comprise a plurality of bends. Other deformed configurations will be obvious to those of ordinary skill in the art having the benefit of this disclosure.

In one embodiment, the one or more processors (116) of the electronic device 100 are operable to detect that a bending operation (301) is occurring by detecting a change in an impedance of the one or more flex sensors (156). The one or more processors (116) can detect this bending operation (301) in other ways as well. For example, the touch sensors can detect touch and pressure from the user 300. Alternatively, the proximity sensors can detect the first end 150 and the second end 151 of the electronic device 100 getting closer together. Force sensors can detect an amount of force that the user (300) is applying to the housing 101 as well. The user (300) can input information indicating that the electronic device 100 has been bent using the display 102 or other user interface (111). Other techniques for detecting that the bending operation (301) has occurred will be obvious to those of ordinary skill in the art having the benefit of this disclosure.

In one or more embodiments, the one or more processors (116) of the electronic device are operable to, when the display 102 is deformed by one or more bends, present a first image 402 on a first portion 404 of the display 102, while presenting a second image 403 on a second portion 405 of the display 102. In this illustrative embodiment, the first portion 404 of the display 102 is disposed on a first side 406 of the single bend 401, while the second portion 405 is disposed on a second side 407 of the single bend 401. As the louvered filter 108 is disposed along the display 102, in one embodiment the one or more processors (116) are operable to present the first image 402 through a first portion 408 of the louvered filter 108 while presenting the second image 403 through a second portion 409 of the louvered filter 108. Here, the first portion 408 of the louvered filter 108 is disposed on the first side 406 of the single bend 401, while the second portion 409 of the louvered filter 108 is disposed on the second side 407 of the single bend 401.

Turning to FIG. 5, the electronic device 100 has been placed on a table 500 so resemble a card folded into a "tent fold," as the electronic device 100 has been deformed by a bending operation (301) into a folded configuration 501 having a single bend 401. This configuration can make the display 102 easier for the user 300 to view since they do not have to hold the electronic device 100 in their hands.

In one or more embodiments, when the electronic device 100 is in the folded configuration 501, the one or more processors (116) are operable to detect the number of folds in the electronic device 100 resulting from the bending operation (301). In one embodiment, after determining the number of folds, the one or more processors (116) can partition the display 102 of the electronic device 100 as another function of the one or more folds. Since there is a single bend 401 here, in this embodiment the display 102 has been partitioned into a first portion 408 and a second portion 409, with each portion 408,409 being disposed on opposite sides of the "tent."

In one or more embodiments, the one or more processors (116) can detect a bend amount 502 as well. As will be described in more detail below, in one or more embodiments the one or more processors (116) can present an indication to adjust the bend amount 502, or alternatively can apply a keystone correction to one or more images presented on the display 102. In one or more embodiments, this can be a function of the detected bend amount 502.

Illustrating by example, recall from above that the folded configuration 501 of FIG. 5 can be used to present left and right images of stereoscopic content on either sides of the tent to provide three-dimensional video content. If the bend amount 502 is about sixty degrees, this may result in too much light being absorbed by the louvered filter 108 when the user (300) is directly above the electronic device 100. Accordingly, the one or more processors (116) may present information on the display 102 requesting the user (300) to reduce the bend amount 502 to something more optimal, such as forty-five degrees. In other embodiments, various image corrections can be applied as a function of the bend amount 502.

Figure 6:
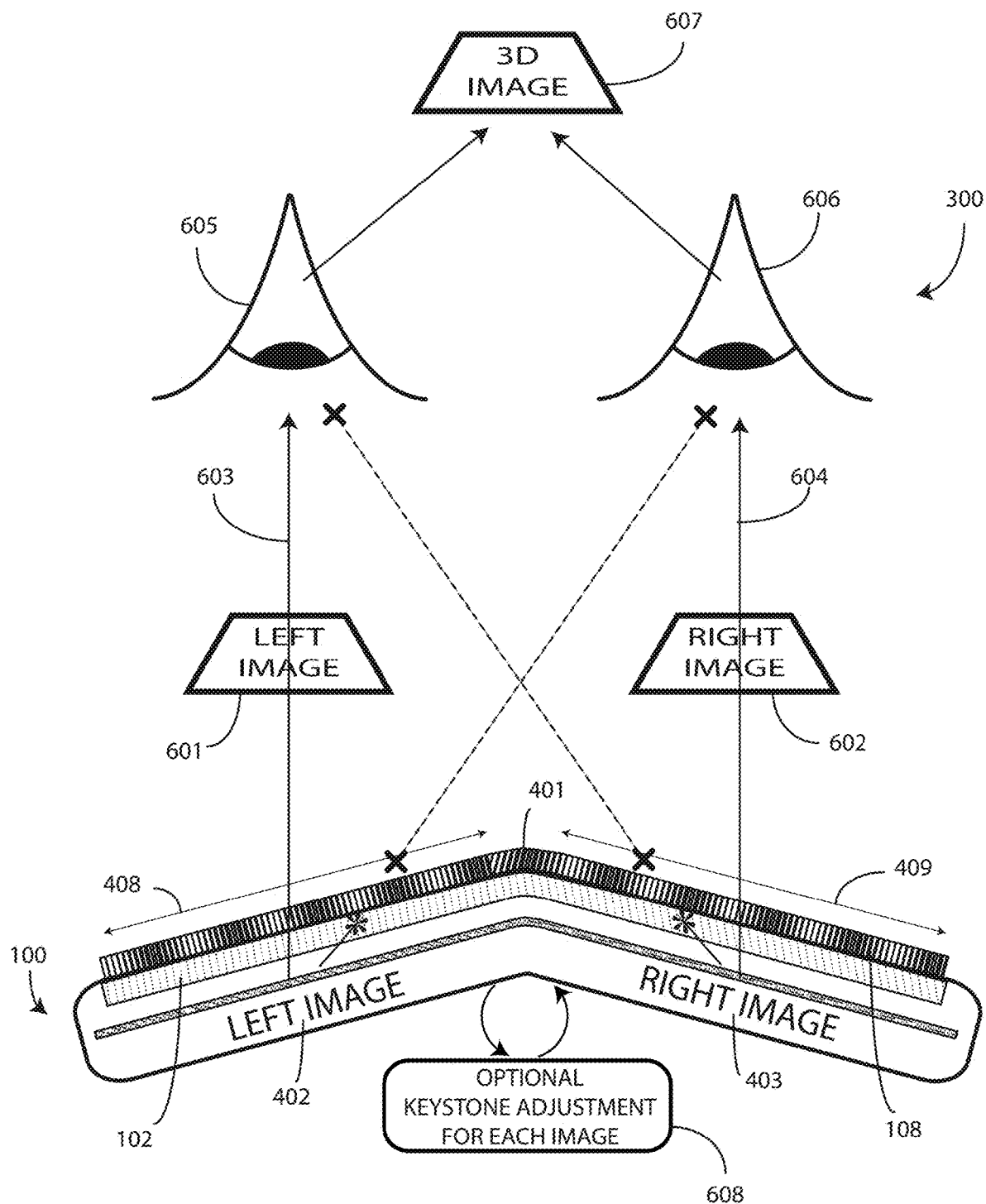
FIG. 6 illustrates one explanatory system executing one or more method steps in accordance with one or more embodiments of the disclosure.

Turning now to FIG. 6, the electronic device 100 is shown delivering stereoscopic content to the user 300. As shown in FIG. 6, when the display 102 is deformed by one or more bends, the one or more processors (116) are configured to present, along the display 102, a first image 402 through a first portion 408 of the louvered filter 108 and a second image 403 through a second portion 409 of the louvered filter 108. In this illustrative embodiment, the first image 402 comprises a left image 601 of stereoscopic image content, while the second image 403 comprises a right image 602 of the stereoscopic image content. The louvered filter 108 is configured to pass the first image 402 through the first portion 408 of the louvered filter 108 along a first axis 603 and to pass the second image 403 through the louvered filter 108 along a second axis 604. The louvered filter 108 precludes the first axis 603 and the second axis 604 from intersecting when the display 102 is deformed by a bend 401 greater than a predefined angle.

Thus, the first image 402 is delivered to the left eye 605 of the user 300, while the second image 403 is delivered to the right eye 606 of the user 300. At the same time, the louvered filter 108 prevents the left eye 605 from seeing the second image 403. Similarly, the louvered filter 108 prevents the right eye 606 from seeing the first image 402. Where the first image 402 comprises a left image 601 of stereoscopic image content and the second image 403 comprises a right image 602 of the stereoscopic image content, these images are delivered to the left eye 605 and the right eye 606, respectively, so that the user's brain can synthesize the images as a three-dimensional perception.

Accordingly, the system of FIG. 6 allows the electronic device 100 to deliver three-dimensional images 607 via "stereo vision" by delivering two different images to two different eyes. In one embodiment, the left image 601 and the right image 602 have data captured from a slightly different perspective. The user's brain then resolves these images to deliver a depth perspective and make the images appear to "pop out" of the display 102. The louvered filter 108 causes only the left image 601 to enter the left eye 605, and causes only the right image 602 to enter the right eye 606. The user's brain then resolves the two images as one or more three-dimensional images 607. Advantageously, using the louvered filter 108, special glasses are not required. Moreover, unlike prior art stereo vision systems, each of the left image 601 and the right image 602 can be a full color image, rather than having to be different colors, such as cyan and magenta, so as to pass through colored lenses of special glasses.

In one or more embodiments, since the left image 601 and the right image 602 are being delivered to the left eye 605 and the right eye 606, respectively, from portions of the display 102 that are not normal to the first axis 603 and the second axis 604, the one or more processors (116) can optionally be operable to apply image correcting adjustments. Illustrating by example, in one embodiment the angle of incidence between the display 102 and the first axis 603 and the second axis 604 introduces asymmetry in the first image 402 and the second image 403. This distortion can take various forms, including one or more of pincushion, coma, and keystone distortion.

Keystone distortion can occur due to the fact that the angle of incidence can cause the first image 402 and the second image 403 to appear to have a first side that is "pinched" relative to the other side due to the display surface being "tilted" relative to the first axis 603 and the second axis 604. This causes the first image 402 and the second image 403 to have shapes resembling a keystone of an arch. Thus, in one or more embodiments, the one or more processors (116) are operable to apply a keystone correction 608 to one or more of the first image 402 or the second image 403.

Figure 7:
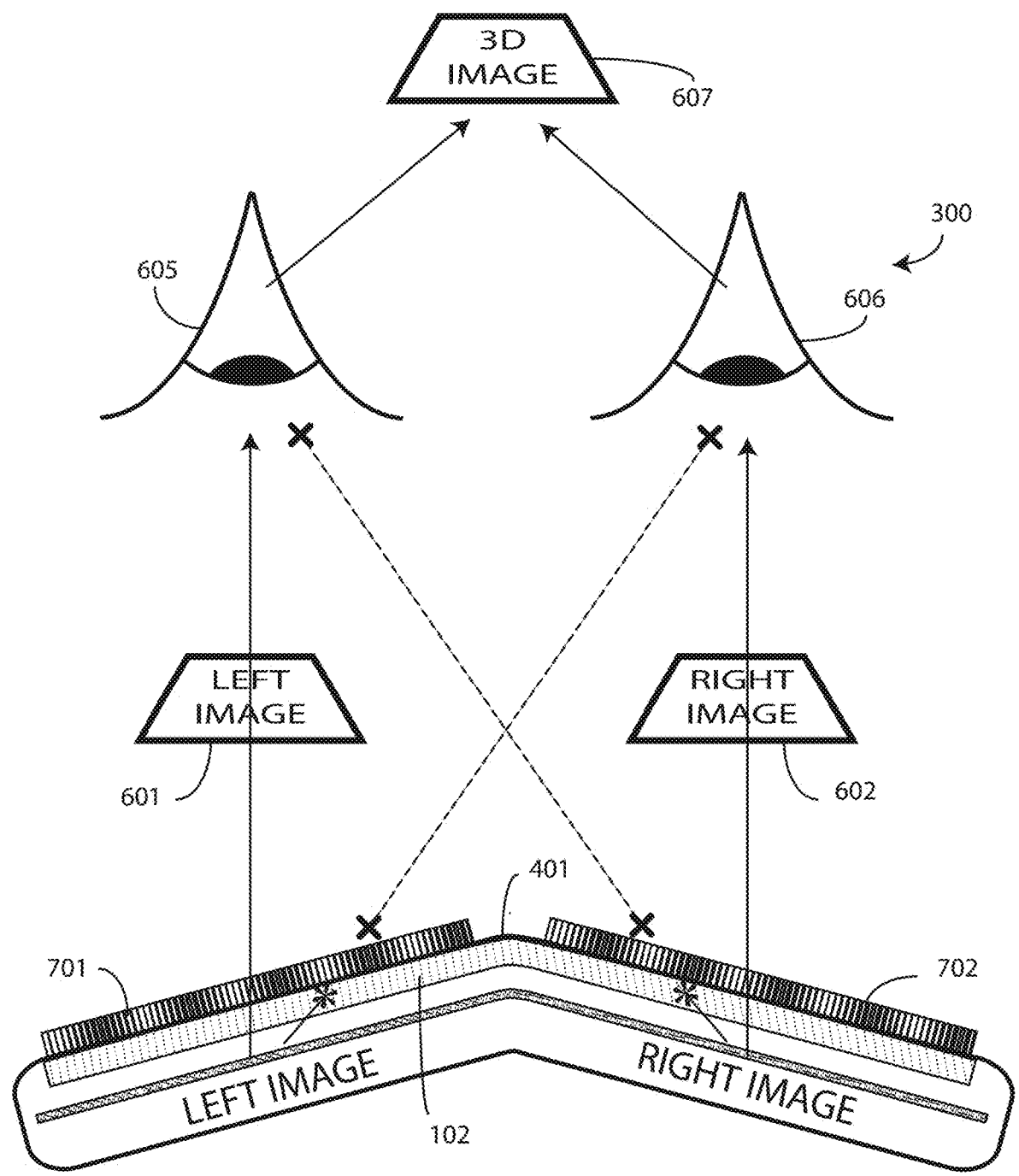
FIG. 7 illustrates another explanatory system executing one or more method steps in accordance with one or more embodiments of the disclosure.

Turning now to FIG. 7, illustrated therein is an alternate system in accordance with one or more embodiments of the disclosure. The system of FIG. 7 operates substantially the same as that of FIG. 6, in that a left image 601 of stereoscopic image content is delivered to a left eye 605 of the user 300 while a right image 602 is delivered to the right eye 606 of the user 300. However, in this embodiment, rather than using a single louvered filter (108), the system includes a first louvered filter 701 disposed to one side of the bend 401 and a second louvered filter 702 disposed on the opposite side of the bend. The use of two louvered filters prevents wear, tear, and/or deformation of the single louvered filter (108) during bending operations (301), while at the same time ensuring that the louvers are all arranged normal to the surfaces of the display 102 disposed to the right and left of the bend 401, respectively.

The first louvered filter 701 prevents the right eye 606 from seeing the left image 601. Similarly, the second louvered filter 702 prevents the left eye 605 from seeing the right image 602. Advantageously, the left image 601 and the right image 602 are delivered to the left eye 605 and the right eye 606, respectively, so that the user's brain can synthesize the images into one or more three-dimensional images 607.

Figure 8:
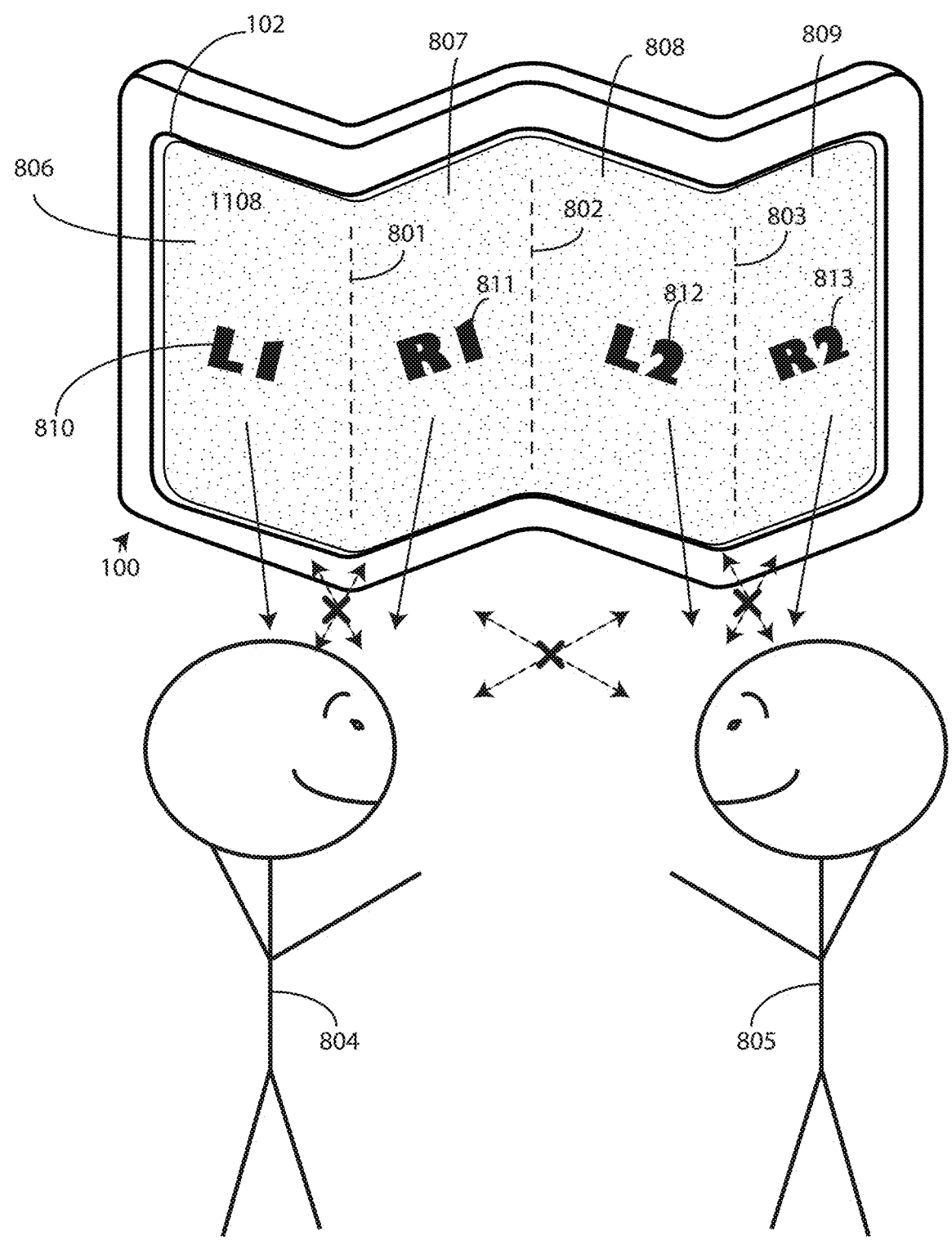
FIG. 8 illustrates yet another explanatory system executing one or more method steps in accordance with one or more embodiments of the disclosure.

As noted above, embodiments of the disclosure are not limited to folded configurations (501) having a single bend 401. To the contrary, embodiments of the disclosure can be used with multiple bends as well. Turning now to FIG. 8, illustrated therein is one such example.

As shown in FIG. 8, rather than being folded with a single bend (401), the electronic device 100 has been deformed by a bending operation (301) into a multi-folded configuration having three bends 801,802,803. In this illustrative embodiment, after determining the number of bends, the one or more processors (116) can partition the display 102 of the electronic device 100 as a function of the one or more bend. Here the display 102 has been partitioned into four portions 806,807,808,809.

When the electronic device 100 is so configured, it can be used to present stereoscopic content to two users 804,805. For example, when the one or more bends comprising at least a first bend 801 and a second bend 803, the one or more processors (116) can be configured to present a first image 810 and a second image 811 on opposite sides of the first bend 801, while presenting a third image 812 and a fourth image 813 on opposite sides of the second bend 803. As previously described, the louvered filter 108 can deliver the first image 810 and the second image 811 to the right and left eyes of a first user 804, respectively, while preventing the first image 810 and the second image 811 from reaching either the left and right eyes of the first user 804, respectively, or the left and right eyes of the second user 805. Similarly, the louvered filter 108 can deliver the third image 812 and the fourth image 813 to the right and left eyes of the second user 805, respectively, while preventing the third image 812 and the fourth image 813 from reaching either the left and right eyes of the second user 805, respectively, or the left and right eyes of the first user 804.

Accordingly, the first user 804 and the second user 805 can each enjoy stereoscopic content on a single electronic device 100. The first user 804 and the second user 805 can watch the same stereoscopic content in one embodiment. However, in another embodiment, the first user 804 and the second user 805 can enjoy different stereoscopic content streams in another embodiment. As the number of bends increases, the number of stereoscopic content streams can increase as well. While the embodiment of FIG. 8 shows three bends 801,802,803 all being in parallel and evenly distributed across the display 102, embodiments of the disclosure are not so limited. The bends can be in different locations and at different alignments relative to each other in other embodiments. Still other embodiments will be obvious to those of ordinary skill in the art having the benefit of this disclosure.

To this point, embodiments of the disclosure have been described with the louvered filter 108 being attached directly to the display 102. While this is one way embodiments of the disclosure can be configured, there are others as well. Embodiments of the disclosure contemplate that while some users may prefer to have the louvered filter 108 available for viewing stereoscopic content, they may prefer to have it be easily removable from the display 102 when not viewing stereoscopic content. For example, they may wish to show two-dimensional pictures to a number of viewers, and may prefer to be able to selectively remove the louvered filter 108 so that the viewers can view the pictures at a variety of angles.

Figure 9:
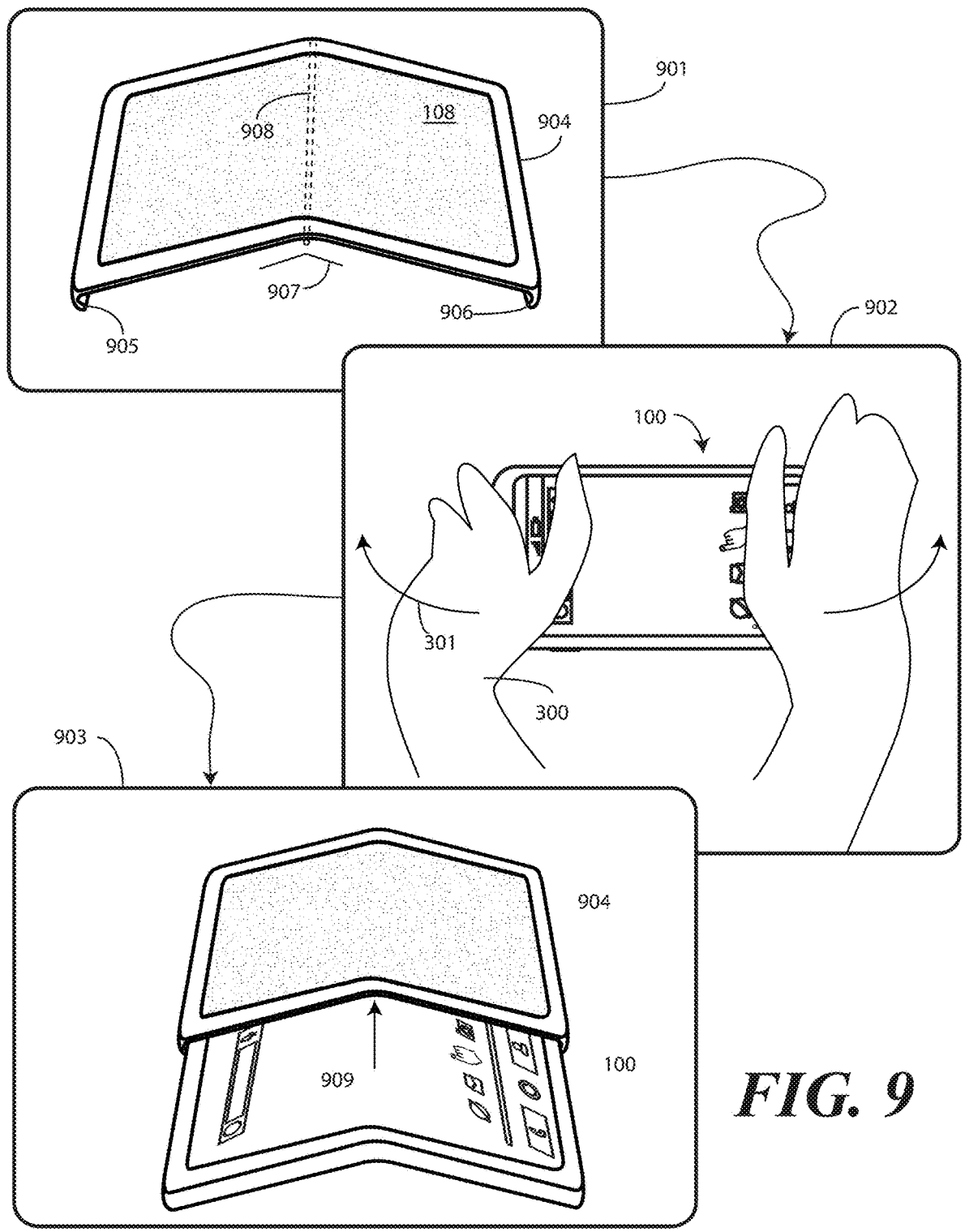
FIG. 9 illustrates yet another explanatory system and one or more method steps in accordance with one or more embodiments of the disclosure.

Turning now to FIG. 9, illustrated therein is one embodiment that addresses this desire. In FIG. 9, at 901 the louvered filter 108 is coupled to an electronic device attachment 904 that is selectively detachable from the electronic device 100. In this illustrative embodiment, the electronic device attachment 904 is a passive mechanical device manufactured from a rigid or semi-rigid material that includes one or more receivers 905,906 to receive an electronic device 100. In one embodiment, the electronic device attachment 904 is manufactured from a rigid thermoplastic and includes a predefined bend 907 that is optimized for its louvered filter configuration for viewing stereoscopic content. Accordingly, the electronic device attachment 904 serves as a mnemonic device instructing the user 300 regarding how much to bend the electronic device 100 with a bending operation 301 for three-dimensional content viewing. In another embodiment, the electronic device attachment 904 includes an optically transparent hinge 908 so that it can be folded when not in use.

To use the electronic device attachment 904, at 902 the user 300 executes a bending operation 301 to bend the electronic device 100 to a predefined configuration. Where the electronic device is manufactured from a rigid thermoplastic and includes a predefined bend 907 that is optimized for its louvered filter configuration for viewing stereoscopic content, the user 300 simply bends the electronic device 100 to match the predefined bend. Where the electronic device attachment 904 includes the optically transparent hinge 908, it can be attached to the electronic device 100 prior to the bending operation 301 occurring. In other embodiments, as noted above, a mechanical actuator (302) or other device can execute the bending operation 301.

At 903, the electronic device attachment 904 is attached to the electronic device 100. In this illustrative embodiment, the electronic device 100 is inserted 909 into the one or more receivers 905,906. The resulting system can then be used as previously described.

As noted above, the amount of bend required for optimal stereoscopic content viewing can change as a function of the louvered filter 108. For example, the bend angle may change depending upon the design and/or characteristics of the louvers. Louvers spaced closer will work optimally with bend angles that are different from when the louvers are spaced further apart. Additionally the depth of the louvers can change the bend angle as well.

Figure 10:
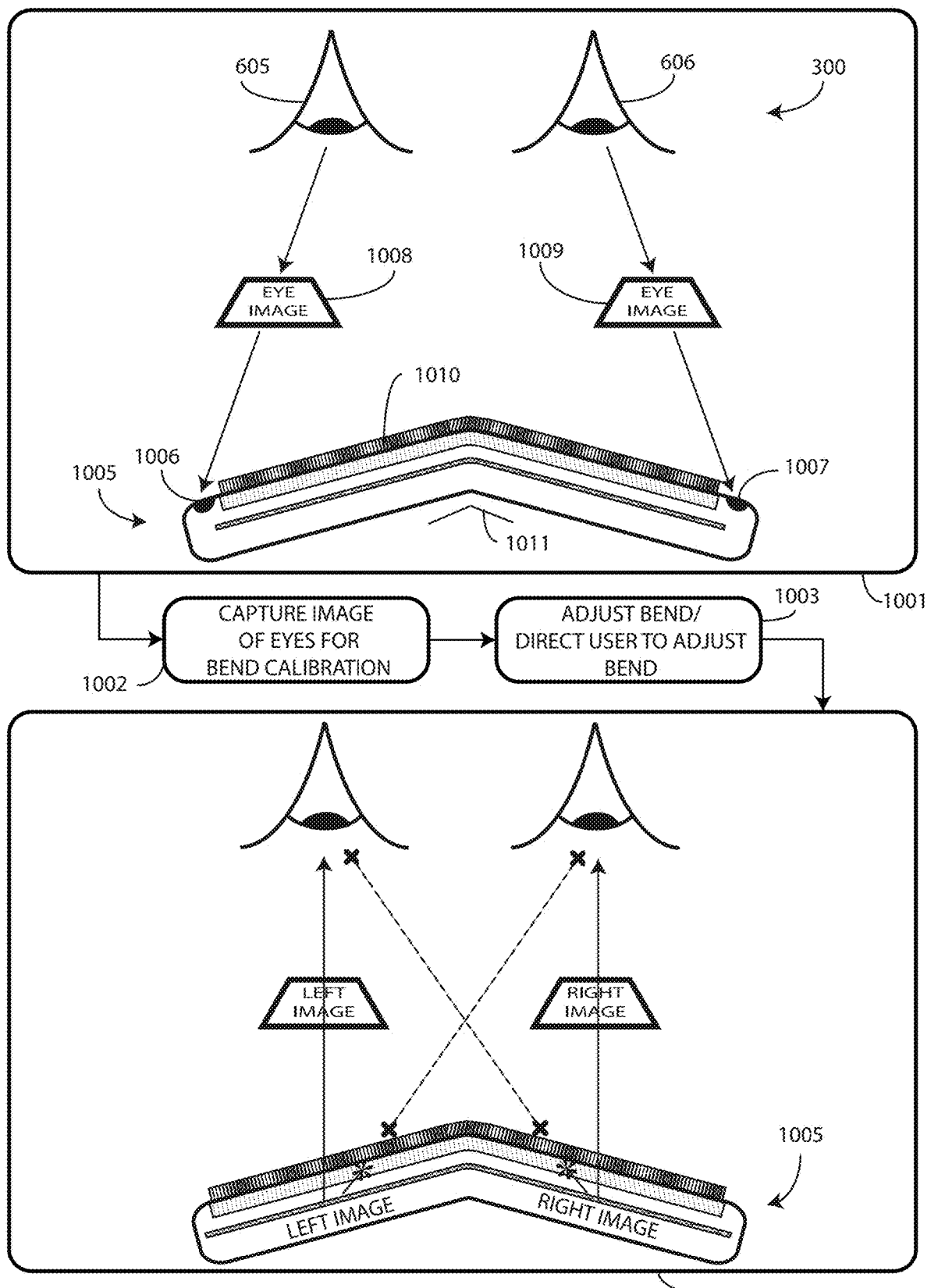
FIG. 10 illustrates yet another explanatory system and one or more method steps in accordance with one or more embodiments of the disclosure.

To ensure that the user 300 enjoys the optimal stereoscopic content viewing experience, embodiments of the disclosure provide various adjustment and/or calibration techniques. Turning now to FIG. 10, illustrated therein is a first such technique.

At step 1001, an electronic device 1005 includes one or more image capture devices or imagers 1006,1007. The imagers 1006,1007 are configured to capture one or more images 1008,1009 of the user 300. For example, the imagers 1006,1007 may capture one or more images 1008,1009 of the user's eyes 605,606, and then deliver those images 1008,1009 to the one or more processors (116).

At step 1002, the one or more processors (116) receive the captured images 1008,1009 from the imagers 1006.1007. The one or more processors (116) may then perform analysis functions on the images 1008,1009 to determine spatial relationships between the user 300 and the electronic device 1005. For example, the one or more processors (116) may determine a distance, angle, or other spatial relationship between the user's eyes 605,606 and the display 1010 of the electronic device 1005.

At step 1003, the one or more processors (116) then perform at least one control operation in response to the images 1008,1009 or as a function of the analysis of the images 1008,1009. The control operation can take any of a number of forms. Illustrating by example, the control operation may be applying a correction, such as a pincushion, coma, or keystone correction as a function of the distance, angle, or other spatial relationship between the user's eyes 605,606 and the display 1010 of the electronic device 1005. In the illustrative embodiment of FIG. 10, the one or more processors present at step 1003, on the display 1010, an indication to adjust the bend amount 1011 as a function of the distance, angle, or other spatial relationship between the user's eyes 605,606 and the display 1010 of the electronic device 1005. The electronic device 1005 can then be used optimally at step 1004 as previously described. Other control operations will be obvious to those of ordinary skill in the art having the benefit of this disclosure. For example, in another embodiment, one or more processors (116) can determine keystone compensation as a function of the analysis of the images 1008,1009. In one embodiment, the keystone compensation for the images presented on the display 1010 can be a function of locating the positions of the user's eyes in relationship to the display 1010, which can include an analysis of both distance and angle.

Figure 11:
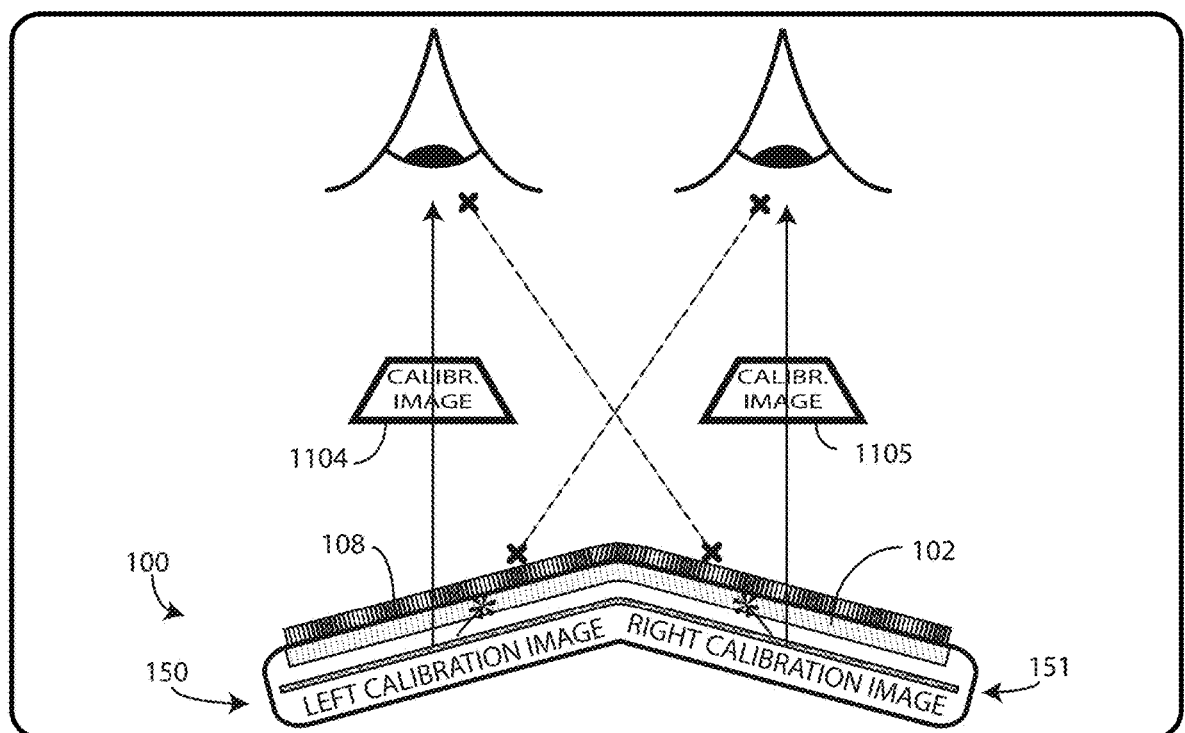
FIG. 11 illustrates yet another explanatory system and one or more method steps in accordance with one or more embodiments of the disclosure.
Figure 11:
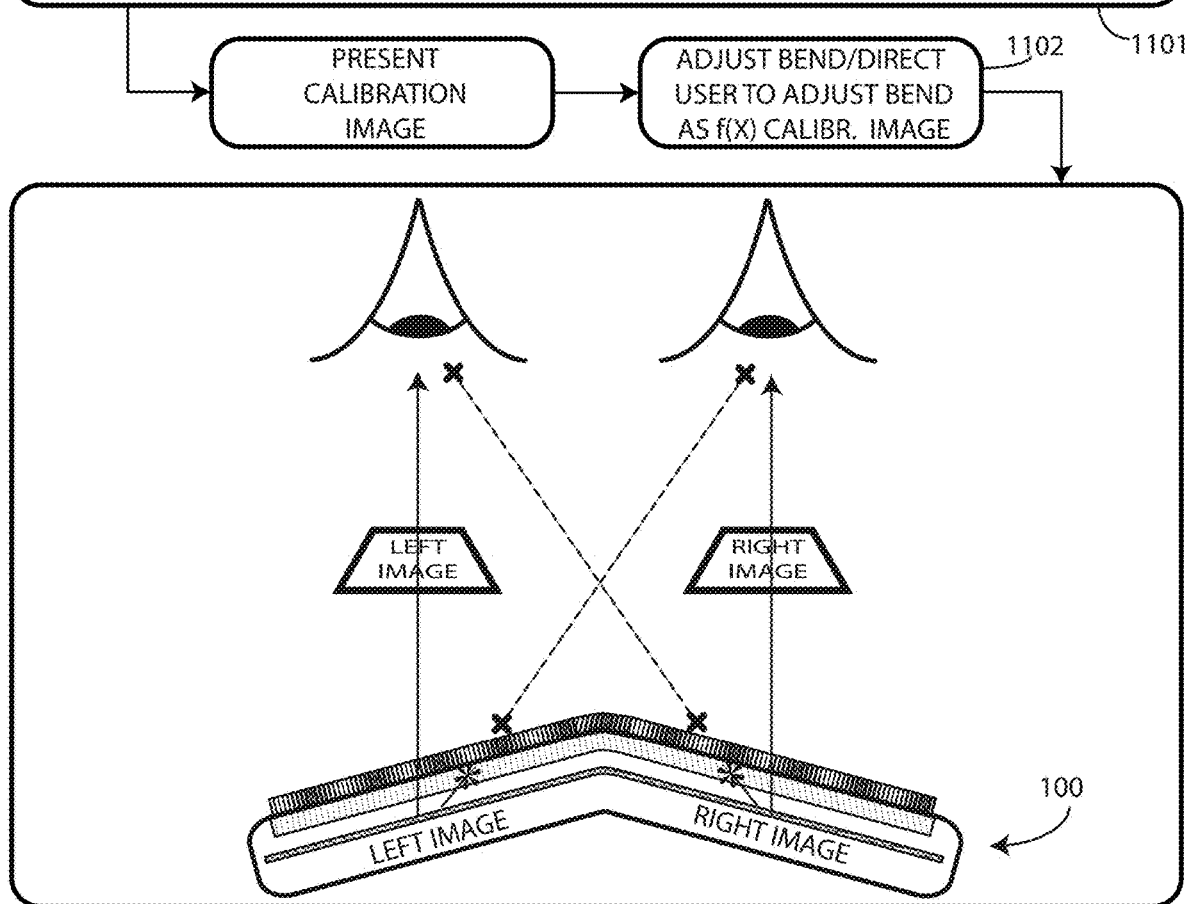

Turning now to FIG. 11, illustrated therein is another method of optimizing the stereoscopic content viewing experience. At step 1101, the one or more processors (116) present, when the display 102 of the electronic device 100 is deformed by one or more bends, one or more calibration images 1104,1105 as a guide to achieving the optimal angle for viewing stereoscopic content. For example, the one or more calibration images 1104,1105 may comprise an oscillating pattern that allows the user 300 to determine how much light is passing through the louvered filter 108. In another embodiment, the one or more calibration images 1104,1105 comprise a pattern of stripes. Other calibration images will be obvious to those of ordinary skill in the art having the benefit of this disclosure.

At step 1102, adjustment of the bend amount can occur as a function of the calibration image. In one embodiment, the user 300 can execute a bending operation (301) by applying force at the first end 150 and the second end 151 of the electronic device 100 to bend both the housing 101 and the display 102. In other embodiments, rather than relying upon the manual application of force, the electronic device can include a mechanical actuator (302), operable with the one or more processors (116), to deform the display 102 by a predefined amount as specified by the user 300. The electronic device 100 can then be used optimally at step 1103 as previously described.

Figure 12:
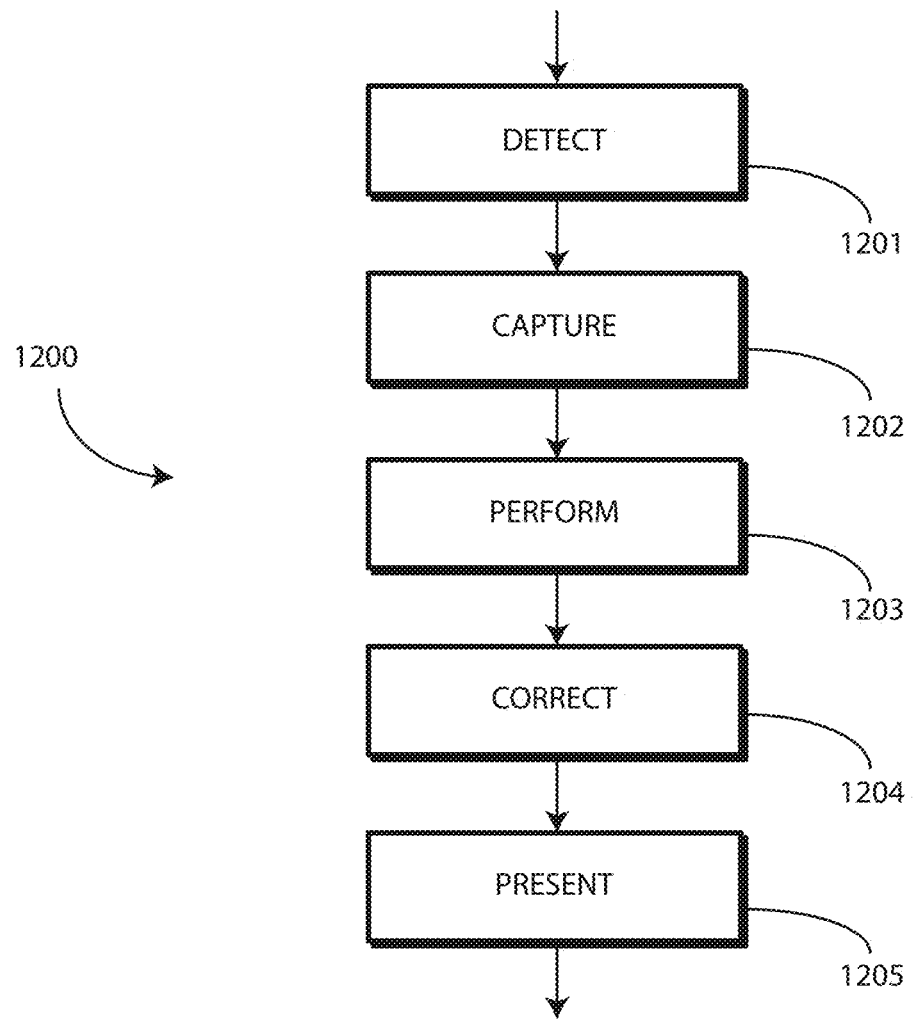
FIG. 12 illustrates one explanatory method in accordance with one or more embodiments of the disclosure.

Turning now to FIG. 12, illustrated therein is one explanatory method 1200 for presenting images, including left and right images of stereoscopic content, in an electronic device having a louvered filter disposed along a flexible display. At step 1201, the method 1200 includes detecting, with one or more processors, at least one bend along the flexible display. In one embodiment, this detection can be performed with one or more flex sensors. In another embodiment, user input from a user interface can identify the at least one bend. Other techniques for detecting the bend will be obvious to those of ordinary skill in the art having the benefit of this disclosure. In yet another embodiment, step 1201 can include actuating a mechanical actuator to deform the flexible display by a predetermined amount, thereby allowing the one or more processors to detect the bend via actuation of the mechanical actuator.

At optional step 1202, the method 1200 optionally captures, with an imager of the electronic device, a captured image. Illustrating by example, step 1202 may capture one or more images of a user's head or eyes for analysis. Step 1202 may optionally also comprise performing analysis functions on the images to determine spatial relationships between the user and the electronic device, including the determination of a distance, angle, or other spatial relationship between the user's eyes and the flexible display of the electronic device. Other analyses will be obvious to those of ordinary skill in the art having the benefit of this disclosure.

At optional step 1203, the method 1200 can perform a control operation as a function of the images captured at step 1202. The control operations may vary, as noted above. However, in one embodiment the control operation comprises the presentation of an indication to adjust the bend amount of the electronic device as a function of the distance, angle, or other spatial relationship between the user's eyes and the display of the electronic device. Other control operations will be obvious to those of ordinary skill in the art having the benefit of this disclosure.

At optional step 1204, one or more image corrections may be applied to image content of the electronic device. These image corrections include applying corrections for pincushion or coma distortion. In one embodiment, step 1204 comprises applying a keystone correction to one or more images.

At step 1205, the method 1200 includes presenting, with the one or more processors, a first image through a first portion of the louvered filter disposed to a first side of the at least one bend and a second image through a second portion of the louvered filter disposed to a second side of the at least one bend. This allows a user to view stereoscopic imagery without the need for special glasses. In addition to this advantageous benefit, embodiments of the disclosure also contemplate that when prior art devices are placed on flat surfaces such as tables or nightstands, their displays are frequently difficult to view. Advantageously, embodiments of the disclosure provide bendable devices that are easily stood on their sides for increased display viewability.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example, while bending was the primary mode of changing a geometry of an electronic device, other techniques, including squeezing, stretching, pulling, and shaking could also be used.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising;
    one or more processors;
    a flexible display, operable with the one or more processors; and
    a louvered filter disposed along the flexible display;
    the one or more processors to, when the flexible display is deformed by one or more bends, present, with the flexible display, a first image through a first portion of the louvered filter and a second image through a second portion of the louvered filter.

2. The electronic device of claim 1, further comprising one or more flex sensors, operable with the one or more processors, to detect the one or more bends along the flexible display.

3. The electronic device of claim 1, the first portion of the louvered filter disposed on a first side of a first bend of the one or more bends, the second portion of the louvered filter disposed on a second side of the first bend of the one or more bends.

4. The electronic device of claim 3, the louvered filter configured to pass the first image through the louvered filter along a first axis and to pass the second image through the louvered filter along a second axis.

5. The electronic device of claim 4, the louvered filter to preclude the first axis and the second axis from intersecting when the flexible display is deformed by a bend greater than a predefined angle.

6. The electronic device of claim 3, the first image comprising one of a right image or a left image of stereoscopic image content, the second image comprising another of the right image or the left image of the stereoscopic image content.

7. The electronic device of claim 1, the one or more bends comprising at least a first bend and a second bend, the one or more processors to:
    present the first image and the second image on opposite sides of the first bend; and
    present a third image and a fourth image on opposite sides of the second bend.

8. The electronic device of claim 1, the louvered filter comprising a plurality of louvers, with each louver oriented substantially orthogonally with a flexible display surface portion disposed adjacent to the each louver.

9. The electronic device of claim 1, further comprising a mechanical actuator, operable with the one or more processors, to deform the flexible display by the one or more bends.

10. The electronic device of claim 1, the one or more processors further to apply a keystone correction to one or more of the first image or the second image.

11. The electronic device of claim 1, the louvered filter coupled to an electronic device attachment that is selectively detachable from the electronic device.

12. The electronic device of claim 11, the electronic device attachment comprising an optically transparent hinge.

13. The electronic device of claim 1, one or more of the first image or the second image comprising a calibration image.

14. The electronic device of claim 1, further comprising at least one imager, the one or more processors further to:
    receive a captured image from the at least one imager; and
    perform at least one control operation in response to the captured image.

15. The electronic device of claim 14, the at least one control operation comprising presenting, on the flexible display, an indication to adjust a bend amount of the one or more bends.

16. A method in an electronic device having a louvered filter disposed along a flexible display, the method comprising:
- detecting, with one or more processors, at least one bend along the flexible display; and
- presenting, with the one or more processors, a first image through a first portion of the louvered filter disposed to a first side of the at least one bend and a second image through a second portion of the louvered filter disposed to a second side of the at least one bend.

17. The method of claim 16, further comprising applying, with the one or more processors, a keystone correction to one or more of the first image or the second image.

18. The method of claim 17, further comprising:
- capturing, with one or more imagers of the electronic device, one or more images of a user's eyes; and
- analyzing the one or more images to determine one or more spatial relationships between a user an the electronic device;
- wherein the keystone correction is a function of the one or more spatial relationships.

19. The method of claim 16, further comprising actuating, with the one or more processors, a mechanical actuator to deform the flexible display by the at least one bend.

20. The method of claim 16, one or both of the first image or the second image comprising a calibration image.

* * * * *